J. D. CHEVALIER.
Improvement in Dental Forceps.
No. 132,354. Patented Oct. 22, 1872.
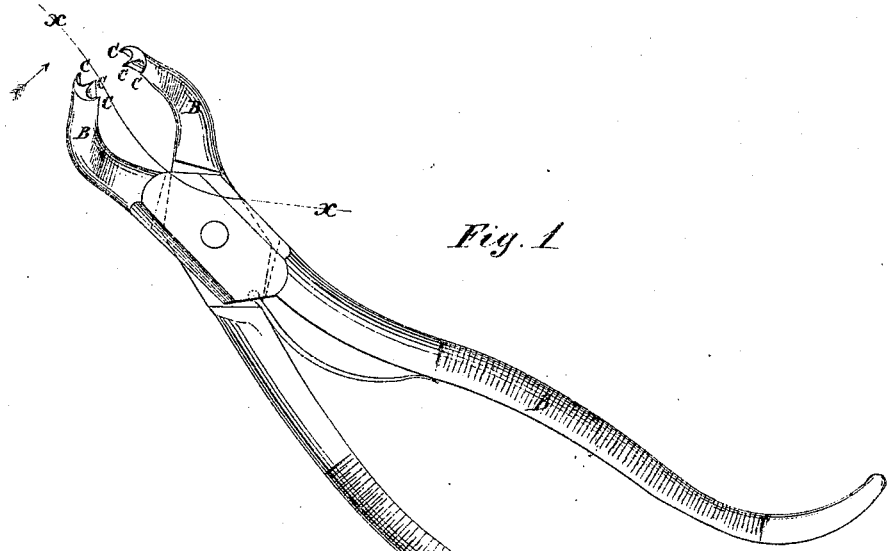
Fig. 1
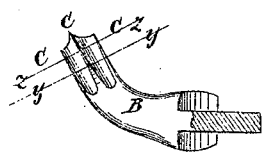
Fig. 2
Fig. 4
Fig. 3
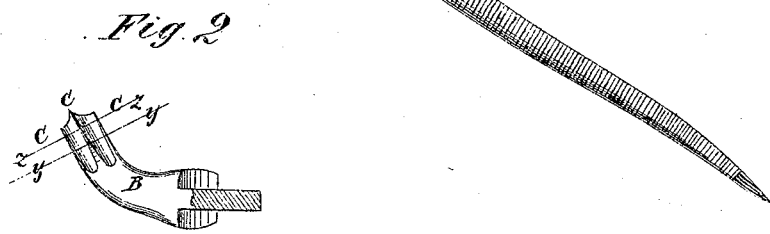
Witnesses:
A. W. Almqvist
Geo. W. Mabee
Inventor:
J. D. Chevalier
Per Munn & Co.
Attorneys.

UNITED STATES PATENT OFFICE.

JOHN D. CHEVALIER, OF NEW YORK, N. Y.

IMPROVEMENT IN DENTAL FORCEPS.

Specification forming part of Letters Patent No. 132,354, dated October 22, 1872; antedated October 15, 1872.

*To all whom it may concern:*

Be it known that I, JOHN D. CHEVALIER, of the city, county, and State of New York, have invented a new and useful Dentists' Forceps, of which the following is a specification:

Figure 1 is a side view of my improved forceps. Fig. 2 is a detail view of the inner side of one of the jaws, cut off through the line $xx$, Fig. 1. Figs. 3 and 4 are detail cross-sections of the same taken through the lines $yy$ and $zz$, Fig. 2.

Similar letters of reference indicate corresponding parts.

My invention has for its object to furnish improved forceps for use in extracting the roots of teeth which have become so much decayed that the forceps now in use cannot take hold of them, and which shall be so constructed as not to remove any of the alveolar process in removing the teeth; and it consists in the blades, one or more, formed upon the inner sides of the jaws of the forceps.

A are the handles, and B are the jaws of the forceps. The shape of the forceps A B is varied, in the ordinary manner, according to the particular teeth for operating upon which the forceps are designed to be used. Upon the middle part of the face of the jaws B is formed a blade, C, which is made with a sharp smooth edge. Upon the side edges of the jaws B are formed blades C, as shown in Figs. 1 and 2 and 3. The space or groove between the blades C is continued to the ends of the jaws, as shown in Figs. 1 and 2. The form, number, and position of the blades C must depend upon the particular teeth the roots of which are to be extracted, and should be so arranged and formed as to enter the grooves of the said roots and thus take a firm hold upon them.

Some forceps will be made with three blades upon each jaw, some with two, some with one; some with one blade upon one jaw and more than one upon the other.

In using the forceps the jaws will be placed over the gum opposite the root to be extracted and forced through the gum and through the alveolar process to grasp the root of the tooth to be extracted, the blades C cutting their way through the said gum and alveolar to the root. Then, as the forceps and root are withdrawn, the blades C slit the gum and alveolar process and cut their way through, leaving the alveolar in its place and in such a condition that it will quickly heal up, so that the loss of the teeth will not cause such a shrinking or falling in of the jaws and gums as when the ordinary forceps are used and a part of the alveolar removed.

Having thus described my invention, I claim as new and desire to secure by Letters Patent—

The blades C, one or more, formed upon the inner side of the jaws B of a dentist's forceps, substantially as herein shown and described, and for the purpose set forth.

JOHN D. CHEVALIER.

Witnesses:
JAMES T. GRAHAM,
T. B. MOSHER.